Dec. 8, 1953 K. McCANN ET AL 2,661,829
CONVEYER LOADING STATION
Filed April 6, 1951 3 Sheets-Sheet 1

INVENTORS
Keith McCann
Roy F. LoPresti
By Murray A. Gleeson
ATTORNEY

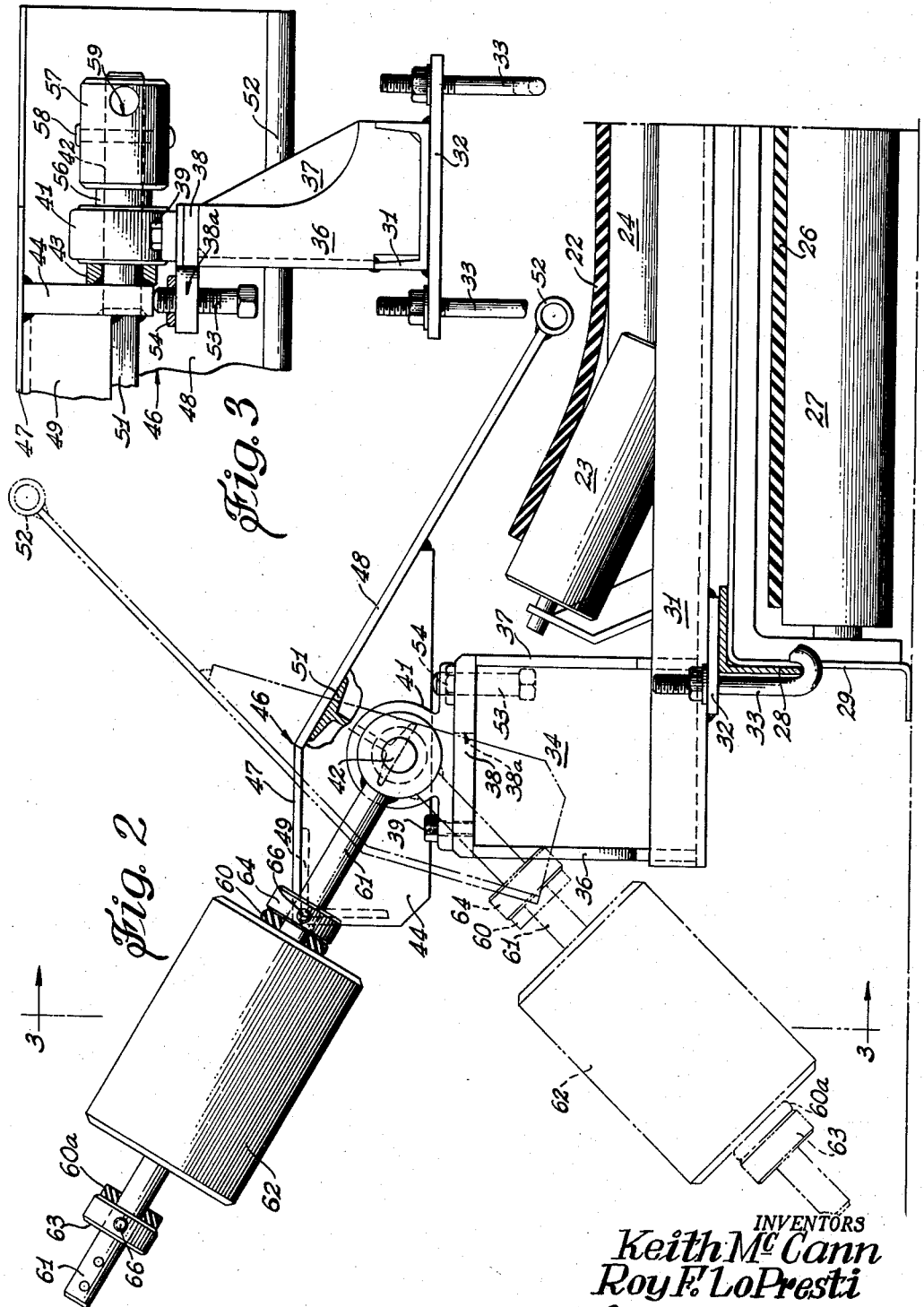

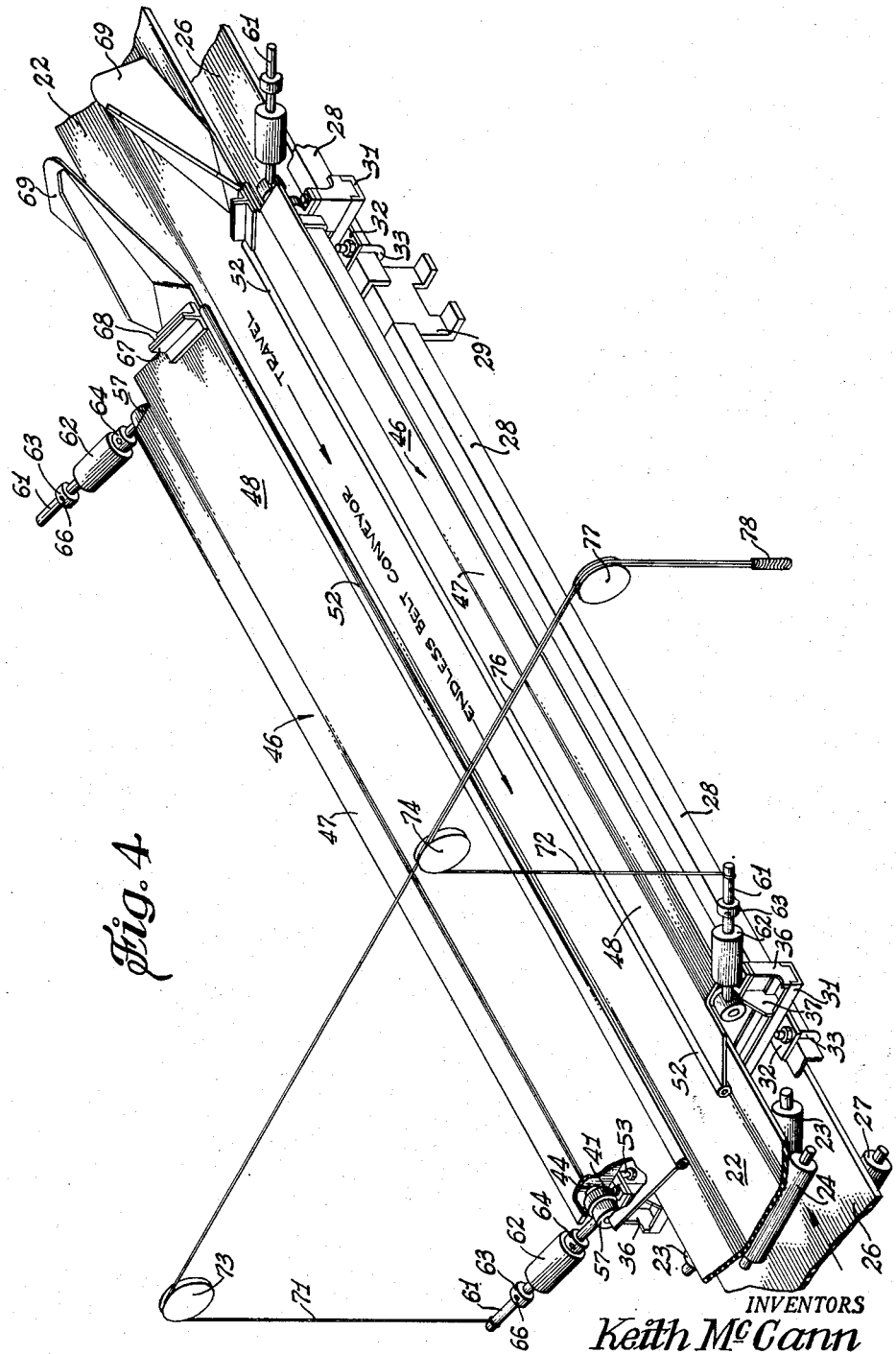

Patented Dec. 8, 1953

2,661,829

UNITED STATES PATENT OFFICE 2,661,829

CONVEYER LOADING STATION

Keith McCann, Taylorville, and Roy F. Lo Presti, Chicago, Ill., assignors to Goodman Manufacturing Company, Chicago, Ill., a corporation of Illinois Application April 6, 1951, Serial No. 219,588

8 Claims. (Cl. 198—52)

This invention relates to improvements in conveyor loading stations particularly adapted for use in mines underground to load a belt conveyor with loose material conveyed thereto as, for example, by shuttle cars.

The principal object of the present invention is to provide an improved loading station for loading a belt conveyor with coal, ore, salt and the like from shuttle cars, the loading station having deflecting aprons which are movable to a stable lowered position for loading and which are movable to a stable raised, out-of-the-way position responsive to a load moving past it from an inbye loading point.

In carrying out the present invention, counterbalanced deflecting aprons are pivotally mounted alongside the belt conveyor for up and down tilting movement. Each apron is provided with an upwardly inclined deflector element at the inbye end which is engaged by a load on the belt to tilt the deflector upward. And each deflecting apron is provided with a counter-balance which is shiftable on the apron responsive to upward tilting movement of the apron to unbalance it in a direction to cause it to remain stably in a raised position until positively urged downward. Further, the counter-balance is shiftable in the opposite direction on the apron when the latter is tilted downwardly to unbalance it in a direction to cause it to remain stably in a lowered position.

In short, the gist of the present invention is to provide a conveyor loading station having hinged deflecting aprons capable of staying in up or down positions until positively moved and having deflector means for automatically raising the aprons when a load passes from an inbye loading station.

Other objects and advantages will be seen from the following description taken in connection with the drawings in which:

Fig. 2 is a fragmentary, enlarged sectional view of one of the loading stations taken along line 2—2 of Fig. 1;

Fig. 3 is a fragmentary elevational view of Fig. 2 as seen along the line 3—3, and with the counterbalance arm not shown; and Fig. 4 is a fragmentary perspective view of one of the loading stations shown in Fig. 1.

Like parts are referred to by like reference characters throughout the figures of the drawings.

Figure 1:
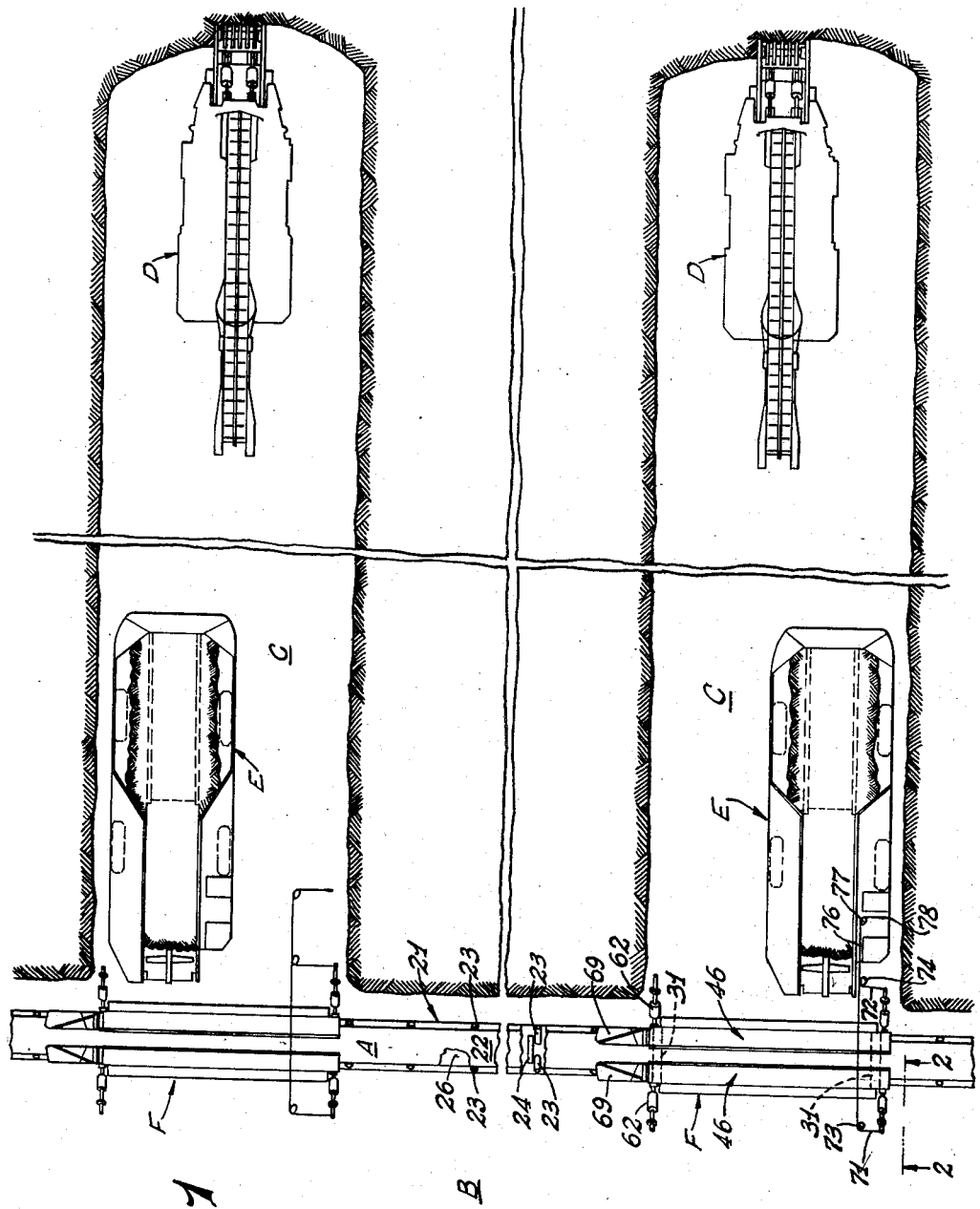
Figure 1 is a fragmentary plan view of an underground mine illustrating two conveyor loading stations made in accordance with the present invention.

Referring now more particularly to the drawings, a main conveyor belt A is shown running along a coal mine entry B for removing coal from rooms C, C which are being driven, for example, by continuous mining and loading machines D, D. Shuttle cars E, E run back and forth between each miner D and a corresponding loading station F and dump the mined coal on the latter.

The improved loading stations F, of which there are two shown in Fig. 1, are the subject of the present invention. They may be identical and the lower one in Fig. 1 will be described below as representative.

Referring first to Figures 1 and 4, it will be seen that the conveyor in this case comprises the usual endless belt trained in an upper, conveying reach 22 supported on troughing rollers 23, 24, 23 and a lower return reach 26 supported on rollers 27, the rollers in turn being suitably supported on brackets (not shown) mounted on a framework comprising pairs of angle beams 28, 28 supported at intervals on inverted, U-shaped, ground-contacting members 29.

As shown in Fig. 1, opposite the entrance to each room C, a pair of longitudinally spaced, channel members 31, 31 are disposed. As shown in Figs. 2 and 3, each channel member is supported at each end on a small welded plate 32 which is clamped atop one of the side rails 28 by a pair of threaded J-clamps 33, 33.

At each end of each channel member 31, that is, at each of the four corners of each loading station F, a transverse, upstanding plate 34 is welded to the channel member. At its inner and outer edges, to define an upstanding box section, are upright longitudinal bracing plates 36, 37 welded to the channel and to plate 34 and having a horizontal plate 38 welded thereto. Mounted on the latter by means of bolts 39 is a pillow block 41 within which a shaft 42 is rotatably journaled. Leftwise (Fig. 3), beyond a spacer 43, the shaft 42 is attached as by welding to a gusset 44. The gusset supports one end of a deflecting apron, generally designated 46, comprising in this case longitudinally extending plates 47 and 48. Since the above-described arrangement is identical at each end of each deflecting apron, it will be seen that the latter is mounted for up and down tilting movement about a horizontal axis intersecting longitudinally spaced pillow blocks 41 at the ends of the apron.

The apron is stiffened in each case by an angle beam 49, I-beam 51, and tube section 52 welded to the plates 47 and 48, respectively.

Downward movement of the apron is limited to any desired proximity with the upper reach of the belt by means of an adjusting screw 53 in plate 38 and having lock nut 54.

Opposite the supporting gusset 44, each pivot shaft 42 has a spacer 56 for an elongated collar 57 which is held on by means of a rivet or pin 58. The collar 57 has a radial bore 59 for receiving a welded-on counter-balance shaft or arm 61 which tilts up and down with the apron.

A counter-weight 62, generally tubular in shape, is slidably mounted on the shaft 61 between stop collars 63 and 64, the latter being adjustably fixed on the counter-weight shaft by means of set screws 66 to limit shifting movement of the counter-weight in both directions. Normally, the stops 63 and 64 will be set so that, when the counter-weight is about half way between them, the apron will be balanced and the counter-weight shaft 61 will be substantially horizontal.

In order to eliminate shock and noise caused by the counterweights striking the stops, suitable shock absorbing means is provided in the form of rubber cushioning washers 60 and 60a on the stops.

Upward movement of the apron is limited by engagement of the gusset 44 with the recessed shoulder 38a on plate 38 as shown in Figures 2 and 3.

In operation, lifting of the apron to move the counter-balance shaft through its horizontal position will cause the weight to shift leftwise (Fig. 2) against the stop 63 thereby shifting the center of weight to the counter-weight side of the pivotal axis to maintain the apron stably in its elevated position (broken lines, Fig. 2) until positively lowered. Conversely, lowering of the apron to move the counter-balance shaft through its horizontal position in the opposite direction will cause the weight to shift rightwise against the stop 64 thereby shifting the center of weight to the apron side of the pivotal axis to maintain the apron stably in its lowered position (solid lines, Fig. 2) until positively lifted. With proper execution of these basic design features, there will never be a condition where the apron will "teeter" or balance between its lowered and raised position unless an operator deliberately causes this set of conditions as, for example, during initial adjustment.

As the description proceeds, it will be apparent to one skilled in the art that other specific counter-weight arrangements may be employed to achieve the desired results. In general, however, the controlling principle is that the counter-weight should be movable relative to the apron which it counter-balances so that upward movement of the apron shifts the counter-weight toward a position of unbalance where it holds the apron in a raised position; and conversely lowering of the apron shifts the counter-weight to an opposite condition of unbalance to hold the apron stably in a lowered position.

At the inbye end of each of the gathering aprons, an upwardly inclined deflector element, mounted by angle beams 67 and 68, attached to the plate 48, provides means for tilting the apron up, automatically, when thrust upward by a belt load being carried past it. The deflecting element is here designated by the numeral 69 in each case.

Upon approaching the loading station, an operator of a shuttle car can conveniently lower both aprons 46, 46 by a simple rope arrangement shown in Fig. 1 where ropes 71 and 72 are shown attached to the ends of the left and right hand counter-balance shaft 61, respectively. These ropes extend upwardly and are trained over roof-mounted sheaves 73, 74 whence they join into a single rope 76 trained downward over roof-mounted sheave 77 to a handle or knot 78 located at a distance from the loading station which is convenient for the operator of the machine.

In some cases where desired the two aprons in any particular loading station may be tied together by a suitable linkage (not shown) for concurrent up and down movement. Thus the rope arrangements 71, 72 might be dispensed with for in such case the aprons could both be lowered simply by running the unloading end of the shuttle car over one of the aprons to press it down against the belt.

In operation, the loading aprons will be lowered by the operator as he approaches the station through the use of the pull rope 76. An interconecting set of lights or other control signals (not shown) will prevent other operators, located inbye, from loading at this time. As soon as the operator discharges his load onto the belt he will simply move his shuttle car back toward the mining machine without bothering to raise the aprons to clear the belt for the inbye operators. This will be done automatically, as above explained, because, as a load comes along the belt it will strike the deflecting element 69 which will lift their aprons upward to an out-of-the-way position where they will be held by the shifting of the counter-weights until the operator subsequently pulls the rope 76.

While one form in which the present invention may be embodied has been shown and described it will be understood that various modifications and variations thereof may be effected without departing from the spirit and scope of the invention as defined by the appended claims.

We claim:

1. A loading station for a belt conveyor comprising: at least one deflector apron overlapping a side of said conveyor and being mounted on a supporting frame for up and down tilting movement between lifted and lowered positions relative to said conveyor about a horizontal axis extending longitudinally of said conveyor; counter-balancing means including a rod carried by said apron and movable through a horizontal position upon tilting movement of the apron between lifted and lowered positions; spaced stops on said rod and a counter-weight shiftable along said rod between limits defined by said stops, said stops being disposed along said rod so that said apron is substantially counter-balanced at a position intermediate its said lifted and lowered positions when the counter-weight is at a corresponding position intermediate the stops; and an upwardly inclined deflector element carried on the inbye portion of said apron and effective to lift the latter upon engagement by a load carried on the conveyor; whereby lifting of said apron by said deflector is effective to tilt said rod through its horizontal position to cause the counter-weight to shift to a limit position where the apron is maintained stably in its lifted position, and whereby further downward movement of the apron shifts the counter-weight to its opposite limit position to maintain the apron stably in its lowered position.

2. A loading station for a belt conveyor according to claim 1 having an adjustably movable element interposed between said supporting frame and said apron effective to limit downward movement of the latter toward said conveyor.

3. A loading station for a belt conveyor comprising: at least one deflecting apron overlapping one side of said conveyor and being mounted for up and down movement between lifted and lowered positions relative to said conveyor; counter-balancing means operably associated with said apron and movable between opposite conditions of unbalance for maintaining said apron selectively stable in either said lifted or said lowered position; an upwardly extending deflector element carried by the inbye end of said apron and effective, when engaged by load on the conveyor, to shift said apron upward, and guide means effective responsive to such upward movement of the apron to guide said counter-balancing means to one of its said conditions of unbalance to maintain said apron stably in its said lifted position; said guide means further being effective responsive to downward movement of said apron to guide said counter-balancing means to the opposite unbalance condition to maintain said apron stably in its said lowered position.

4. A loading station for a belt conveyor comprising: at least one deflector apron overlapping one side of said conveyor and being mounted for up and down tilting movement between lifted and lowered positions relative to said conveyor about a horizontal axis extending longitudinally of said conveyor; a counter-balancing shaft carried by said apron having spaced stops thereon with a counter-weight shiftable between limits defined by said stops corresponding to unbalance conditions in which the center of gravity of the apron-counter-weight assembly is selectively on one side or the other of said axis to maintain the apron stably in its lifted or lowered position; and means for moving said apron between its lowered and lifted position.

5. A loading station for a belt conveyor comprising: at least one deflecting apron overlapping one side of said conveyor and being pivotally mounted for up and down tilting movement between lifted and lowered positions relative to said conveyor about an axis extending longitudinally of said conveyor; an arm having a counter-weight carried by said apron; said counter-weight being mounted for movement relative to the deflecting apron from one side to another of a position for balancing said apron intermediate its lifted and lowered positions, and being shiftable through said balancing position responsive to lowering of the apron to thereby maintain the latter stably in its said lowered position.

6. A loading station for a belt conveyor comprising: at least one deflecting apron overlapping one side of said conveyor and being pivotally mounted for up and down tilting movement between lifted and lowered positions relative to said conveyor about an axis extending longitudinally of said conveyor; an arm, having a counter-weight, carried by said apron; an upwardly extending deflector element at the inbye end of said apron adapted to be engaged by load on the conveyor to lift the apron; said counter-weight being mounted for movement relative to the deflecting apron from one side to another of a position for balancing said apron intermediate its lifted and lowered positions, and being shiftable through said balancing position responsive to lifting of the apron by the deflector element to thereby maintain the apron stably in its lifted position.

7. A loading station for a belt conveyor comprising: at least one deflecting apron overlapping one side of said conveyor and being mounted for up and down movement between lifted and lowered positions relative to said conveyor; counter-balancing means operably associated with said apron and mounted for movement from one side to another of an over-center position at which the apron is substantially counter-balanced; and means for shifting said counter-balancing means through said over-center position responsive to downward movement of the apron to maintain the latter stably in its lowered position.

8. A loading station for a belt conveyor comprising: at least one deflecting apron overlapping one side of said conveyor and being mounted for up and down movement between lifted and lowered positions relative to said conveyor; counter-balancing means operably associated with said apron; an upwardly extending deflector element at the inbye end of said apron adapted to be engaged by the load carried by said conveyor to lift the apron; said counter-balancing means being mounted for movement relative to the deflecting apron from one side to another of an over-center position for counter-balancing said apron and being shiftable through said over-center position responsive to lifting of the apron to thereby maintain the latter stably in its lifted position.

KEITH McCANN.
ROY F. LO PRESTI.

References Cited in the file of this patent
UNITED STATES PATENTS

| Number | Name | Date |
|---|---|---|
| 2,367,609 | Prins | Jan. 16, 1945 |